Oct. 23, 1956   H. W. JOHNSON ET AL   2,767,677
JIG FOR WELDING SLIP-ON FLANGES
Filed Oct. 30, 1952
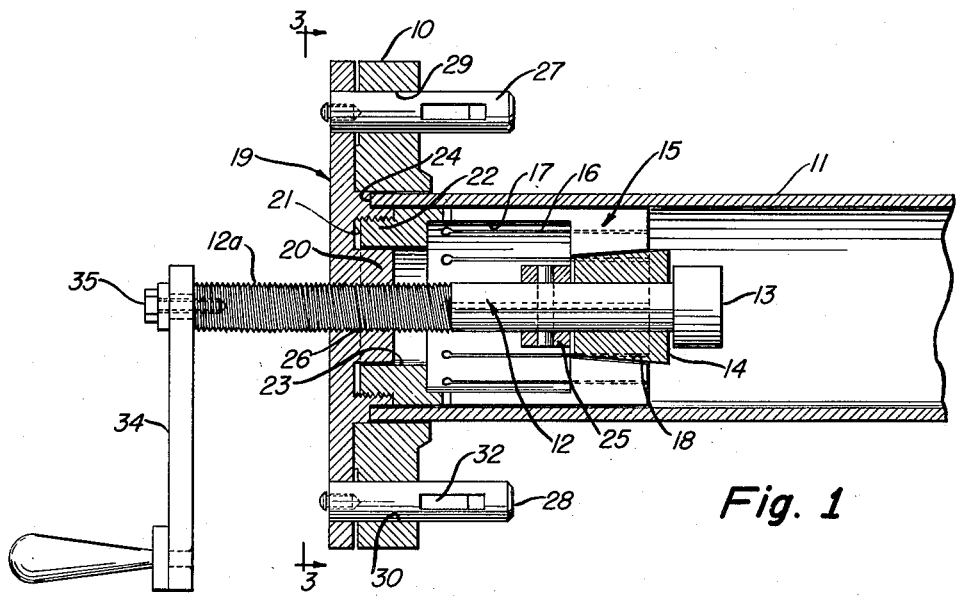
Fig. 1
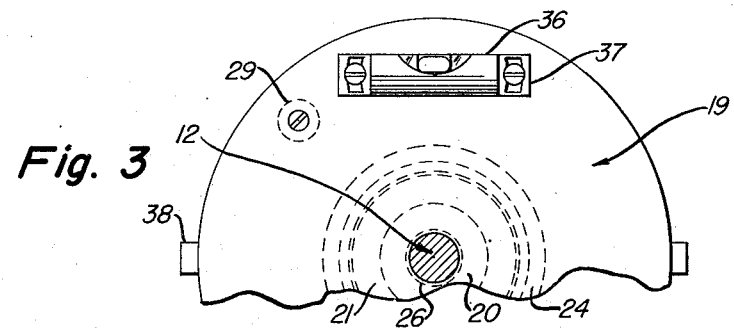
Fig. 3
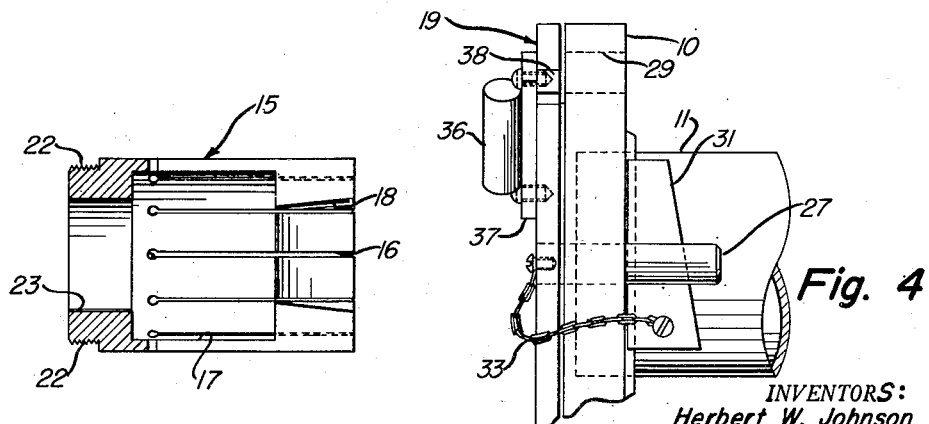
Fig. 2
Fig. 4
INVENTORS:
Herbert W. Johnson
George Menyea
BY  Everett A. Johnson
ATTORNEY

United States Patent Office 2,767,677
Patented Oct. 23, 1956

2,767,677

JIG FOR WELDING SLIP-ON FLANGES

Herbert W. Johnson and George Menyea, Chicago, Ill., assignors to Standard Oil Company, Chicago, Ill., a corporation of Indiana Application October 30, 1952, Serial No. 317,802

3 Claims. (Cl. 113—103)

This invention relates to welding apparatus and more particularly to a device for assuring perfect alignment of slip-on flanges to pipe.

An important object of the invention is to provide means for supporting pipe flanges while welding them in position. Heretofore, this has ordinarily been done by positioning the pipe to which the flange is to be welded in a V jig and supporting the flange in position over the end of the pipe with the desired set back. The flange is then tack-welded to the pipe at spaced points around the pipe preliminary to welding on the inside to the end of the pipe and to the outside of the pipe. Such a system involved a considerable loss of time, was difficult to manipulate when one end of the pipe is already in fixed position, and nonuniform welding conditions resulted since it was difficult to maintain the desired set back of the flange and pipe end.

A specific object of our invention is to provide means which will support the flange and the adjacent end of the pipe to maintain the proper set back between the flange face and the pipe end. A further object of our invention is to provide means for maintaining perfect axial alignment between these parts during the welding operation.

An additional object is to provide an apparatus which is of such construction that it may be readily positioned in the pipe and support the flange. Another object is to provide such as apparatus which is readily clamped into position in a manner which insures and maintains concentricity of the pipe and flange. These and other objects of our invention will become apparent as the description thereof proceeds.

Briefly, our invention includes an expandable apparatus for positioning and aligning a slip-on flange. It includes a tapered expandable bushing which has been milled with longitudinal slots through a major portion of its length. This permits it to expand on one end to engage the inside diameter of the pipe. A solid bushing, having a tapered exterior surface, slides freely on a center shaft or arbor and engages the tapered end of the slotted expandable bushing thereby expanding the split sleeve and securing the apparatus in place inside the pipe. The center arbor is thereby held rigid and in alignment. A collar is pinned to the arbor within a recess in the expandable bushing and serves as a stop for the tapered bushing which is carried by the arbor.

A slip-on flange is held snugly on the fixture by means of a supporting flange threaded to one end of the tapered expandable bushing. Mounting pins extend rearwardly from the supporting flange and are provided with slots adapted to receive tapered pins for holding the slip-on flange against the supporting flange. When the screw or the arbor is turned the split tapered bushing is expanded. The center arbor becomes rigid and holds the face of the slip-on flange at right angles to the center line of the pipe section, while the flange is tack-welded in place.

On the outer surface of the supporting flange face we have provided a level so that the bolt holes of the flange on opposite ends of a given length of pipe are in register and in alignment.

The apparatus is inserted into the pipe to which the flange is to be welded by drawing down and expanding the sleeve. The center position of the flange is lined up perpendicularly to the center line of the pipe. After the pipe flange and pipe have been tack-welded in the desired spacing, the arbor screw is turned and the tapered bushing is moved inward of the expanding sleeve thereby allowing the expanding sleeve to retract. This permits the removal of the apparatus from the pipe. Thus the flange is held firmly in place for spot welding after which time the apparatus can be removed and the welding completed.

Further details of our invention will be described with reference to a preferred embodiment thereof illustrated in the drawings wherein:

Figure 1 is a longitudinal section through a pipe and flange section held in a welding relationship by the tool;

Figure 2 is a longitudinal section of the expandable pipe grip;

Figure 3 is a view along the line 3—3 in Figure 1 rotated counterclockwise 45°; and Figure 4 is a fragmentary plan view of the device in Figure 1 illustrating the wedging means and level associated with the supporting flange.

Referring to the drawings, a flange 10 of the slip-on type is shown in welding position on pipe section 11. An arbor shaft 12 having a head 13 passes axially within a tapered bushing 14 which is in a slide fit with the expanding sleeve 15. The sleeve 15 is provided with a multiplicity of longitudinal slots 16 which are open to one end of the sleeve 15 and terminating short of the other end of the body of sleeve 15. An enlarged bore 17 in the sleeve 15 makes sleeve more flexible. A tapered bore 18 engages the tapered surface of the bushing 14.

A flange guide plate 19 is provided with a boss 20 having an annular channel 21. The unslotted end of the sleeve 15 is provided with a threaded stem 22 through which passes bore 23. The threads in the channel 21, the bore 23, accommodate the center of the boss 20.

A shoulder 24 on the boss 20 is adapted to abut the end of the pipe 11. In this manner, the desired set back of the end of the pipe 11 within the flange 10 is assured. In the illustrated design, the tool provides for having the pipe set back 0.25 inches from the flange which allows for a bead of weld inside of the flange as well as on the top of the pipe where the flange is welded to it.

The arbor shaft 12 is threaded at 12A to engage threaded bore 26 in the boss 20. A stop ring 25 is pinned to the shaft 12 and restricts the outward axial movement of the tapered bushing 14.

The support plate 19 is integral with the boss 20 and is provided with a pair of flange mounting pins 27 and 28. The flange 10 to be welded over the end of the pipe 11 is threaded onto the mounting pins 27 and 28 by means of the opposed bolt holes 29 and 30. Wedges 31, which pass through the slots 32 in pins 27 and 28, are used to secure the flange 10 with its front face against the back face of the plate 19. Retaining chain 33 prevents the loss of the wedges 31.

A crank 34 is fastened to the outer end of the arbor shaft 12 in any conventional manner, such as by means of a rectangular stub on the shaft 12 and a machine bolt 35.

In Figures 3 and 4 we have illustrated a level 36 which is provided for the purpose of aligning the flange 10 so that the bolt holes will register properly with other flanges in the pipe system. Ordinarily, the fixture or assembly is arranged within the pipe 11 in such a manner that the level 36 is in its center position thereby positioning the mounting pins 27 and 28 in a uniform position with respect to all pipes. However, if it is desired to weld a flange 10 onto a pipe end which is to mate or register with a flange already in place and not level, then the support 37 for the level 36 may be adjusted so as to place the level in a new position with respect with the periphery and pins of the plate 19. Thus, when the assembly is used on the mating pipe end and arranged to be centered on the adjusted position of the level, then the bolt holes of the flange will be in alignment. Spurs 38 are provided on opposite edges of the plate 19 to permit the necessary adjustment of the plate to the "level" position.

The holding tool or welding jig illustrated in the drawings and described above is attached not only to align the flange and pipe section to be welded and to hold them in proper welding arrangement, but is adaptable for small variations in the internal diameter of the flange and pipe section. It will be understood that the expanding cylinder or sleeve 15 is adapted to grip the interior of the pipe 11, notwithstanding the slight differences in diameter or irregularity in the internal section. The tool contacts the pipe section at a point remote from the end of the pipe where the welding takes place and, therefore, cannot be damaged during the welding operation.

In using the device, the sleeve 15 is slipped into the pipe 11 with the tapered bushing 14 backed away from the tapered bore 18. The support plate 19 is brought against the end of the pipe 11 with the shoulder 24 in abutment therewith. The flange 10 at this point is already in position on the pins 27 and secured thereto by the wedges 31.

After the plate 19 has been rotated so as to indicate that the device is level, the crank 34 is turned causing the worm 12A to move outwardly within the threaded bore 26 in the boss 20. This causes the head 13 on the arbor shaft 12 to engage the sleeve 14 and carry it forward within the tapered bore 18 in the cylinder 15 thereby causing the cylinder or sleeve 15 to expand and grip the interior surface of the pipe 11.

Although we have described our invention with reference to a particular embodiment thereof which is set out in considerable detail, it should be understood that this is by way of illustration only. Accordingly, modifications in the device by those skilled in the art are contemplated without departing from the scope of the invention described herein or defined by the appended claims.

We claim:

1. A portable apparatus for holding a slip-on flange and a pipe section in welding relationship comprising in combination an expandable cylinder, peripherally spaced longitudinal slots in the wall of said cylinder, each of said slots being of substantially the same length and shorter than the total length of said cylinder to provide a non-expandable terminal end on said cylinder, a tapered bore within said cylinder adjacent the slotted end thereof, a tapered bushing means extendable within said tapered bore for uniformly expanding the slotted end of said cylinder, a screw shaft means arranged co-axially with said cylinder and secured to said tapered bushing, a thrust plate means removably fixed to the terminal end of said cylinder, said plate extending radially beyond the outer wall of the said cylinder and a threaded bore in said plate which accommodates said screw shaft means, whereby rotating said shaft means within said thrust plate means draws the tapered bushing toward said plate means and within said tapered bore to expand said cylinder.

2. A welding jig for holding a pipe flange and a pipe end section in welding alignment comprising in combination expander means smaller in diameter than and adapted to extend longitudinally within the pipe section adjacent the end thereof, a support plate extending radially beyond the outer periphery of the said expander means, a central boss on said plate, the outer periphery of said boss being not greater than the inner diameter of the pipe section, a threaded bore through said plate and said boss, said expander means including a tapered bore in a generally cylindrical member, a plurality of circumferentially spaced slots extending through the wall of said member from one end thereof to a plane short of the other end, an annular channel concentric with said threaded bore and within said boss, said annular channel receiving one end of said expander means, an arbor means supporting a screw shaft threaded within said threaded bore in said boss, a tapered bushing rotatably mounted on said shaft and extending within said tapered bore, a first bushing stop on said shaft adjacent one end of said tapered bushing and a second bushing stop on said shaft adjacent the other end of said tapered bushing, flange-supporting pins carried by said plate, closed slots through the said pins remote from said plate, wedge means insertable into said slots in said pins to align a flange with respect to said pipe section, and crank means for rotating said shaft thereby moving said tapered bushing axially with respect to said plate and the said expander means.

3. The apparatus of claim 1 which includes an annular channel concentrically arranged about said threaded bore in said boss, and threaded means on said terminal end of said cylinder for threaded engagement with said channel.

References Cited in the file of this patent

UNITED STATES PATENTS

| 138,947 | Smith | May 13, 1873 |
| 725,874 | Riley | Apr. 21, 1903 |
| 726,488 | Witzenmann et al. | Apr. 28, 1903 |
| 831,095 | Polson | Sept. 18, 1906 |
| 892,287 | Morse | June 30, 1908 |
| 914,743 | McDonald | Mar. 9, 1909 |
| 1,281,861 | Sibley | Oct. 15, 1918 |
| 1,813,096 | Stenner | July 7, 1931 |
| 1,940,910 | Hickey | Dec. 26, 1933 |
| 2,323,039 | Hill | June 29, 1943 |
| 2,522,459 | Mitchell | Sept. 12, 1950 |
| 2,524,168 | Harnish | Oct. 3, 1950 |
| 2,585,343 | Newlon | Feb. 12, 1952 |
| 2,667,139 | Campbell | Jan. 26, 1954 |
| 2,668,511 | Eberle | Feb. 9, 1954 |

FOREIGN PATENTS

| 367,095 | Germany | Jan. 16, 1925 |